(12) United States Patent  
Roopnarine

(10) Patent No.: US 9,303,789 B2  
(45) Date of Patent: Apr. 5, 2016

(54) DISCONNECT DEVICE FOR SUSPENDED LINES

(71) Applicant: Roopnarine, New York, NY (US)

(72) Inventor: Roopnarine, New York, NY (US)

( * ) Notice: Subject to any disclaimer, the term of this patent is extended or adjusted under 35 U.S.C. 154(b) by 0 days.

(21) Appl. No.: 14/190,864

(22) Filed: Feb. 26, 2014

(65) Prior Publication Data

US 2014/0239129 A1    Aug. 28, 2014

Related U.S. Application Data

(60) Provisional application No. 61/770,079, filed on Feb. 27, 2013.

(51) Int. Cl.
*F16L 3/00* (2006.01)
*H02G 7/04* (2006.01)
*H02G 1/02* (2006.01)

(52) U.S. Cl.
CPC .. *F16L 3/00* (2013.01); *H02G 7/04* (2013.01); *H02G 1/02* (2013.01)

(58) Field of Classification Search
CPC .............. H01R 4/36; H01R 4/28; H01R 4/34; F16L 3/00; H02G 1/02; H02G 7/04
See application file for complete search history.

(56) References Cited

U.S. PATENT DOCUMENTS

| | | | |
|---|---|---|---|
| 4,882,647 A * | 11/1989 | Collins | 361/119 |
| 6,213,818 B1 * | 4/2001 | Chadbourne | 439/810 |
| 6,431,885 B1 * | 8/2002 | Stroup | 439/94 |
| 8,152,573 B2 * | 4/2012 | Bauer et al. | 439/782 |
| 8,480,414 B2 * | 7/2013 | Carnevale et al. | 439/97 |

* cited by examiner

*Primary Examiner* — Amy Sterling
(74) *Attorney, Agent, or Firm* — Leighton K. Chong

(57) ABSTRACT

A disconnect device for suspended lines has: (1) a ground member that provides a supporting structure for mechanically grounding and/or tying the device to a supporting pole and (2) a disconnect member to which a suspended line or cable is attached that is movable or rotatable for detachment from the ground member.

18 Claims, 14 Drawing Sheets

DISCONNECT DEVICE FOR SUSPENDED LINES

This U.S. Patent Application claims the priority benefit of U.S. Provisional Application 61/770,079 filed on Feb. 27, 2013, of the same title, by the same inventor.

TECHNICAL FIELD OF INVENTION

This invention relates to an automatic disconnect of a line or cable from a point of suspension above ground. The invention may be particularly useful to electric and other utility companies that use poles to support suspended transmission lines. The device can be used to disconnect any type of cable, rope or wire that is suspended above ground from the supporting pole or attachment points.

BACKGROUND OF INVENTION

It is known that the primary reason for delays in restoring electric power after storms or fallen trees is the need to replace the supporting poles. The increased load from these types of events is most responsible for poles falling, snapping or breaking. A solution is needed to prevent overloading of supporting poles by automatically disconnecting the line or lines from the pole.

SUMMARY OF INVENTION

In accordance with the present invention, a disconnect device for suspended lines comprises: (1) a ground member that provides a supporting structure for mechanically grounding and/or tying the device to a supporting pole; and (2) a disconnect member that is movable or rotatable for detachment from the ground member to which a suspended line or cable is attached.

In a preferred embodiment, a slotted ground block is formed from two side plates fastened or welded to a solid end plate leaving its opposite end open. Located inside the slotted area of the ground block is a disconnect block which is also slotted or has an open end. This disconnect block is nestled inside of the open slot of the ground block. The suspended line or cable is attached to the closed end of the disconnect block. The open end of the disconnect block is pinned near the open end of the ground block to allow the disconnect block to rotate downwardly with respect to the ground block. The disconnect block is stopped from rotating in the counter-clockwise (upward) direction by a hardstop. The disconnect block is initially retained from rotating downward by shear pins which engage its lower edges. Applying a downward force on the end of the disconnect block allows it to push through or sever the shear pins and rotate downward to disengagement.

Other objects, features, and advantages of the present invention will be explained in the following detailed description of the invention having reference to the appended drawings.

DETAILED DESCRIPTION OF INVENTION

In the following description, certain exemplary embodiments of the present invention are described in detail. However, it is to be understood that these examples are intended for illustration of the principles of the invention disclosed herein, and that many other variations and modifications may be made as would be ascertainable to one skilled in this field of art.

In accordance with the present invention, a disconnect device for suspended lines has two major components: (1) a ground member that provides a supporting structure for mechanically grounding and/or tying the device to a supporting pole and (2) a disconnect member to which a suspended line or cable is attached that is movable or rotatable for detachment from the ground member.

Figure 1:
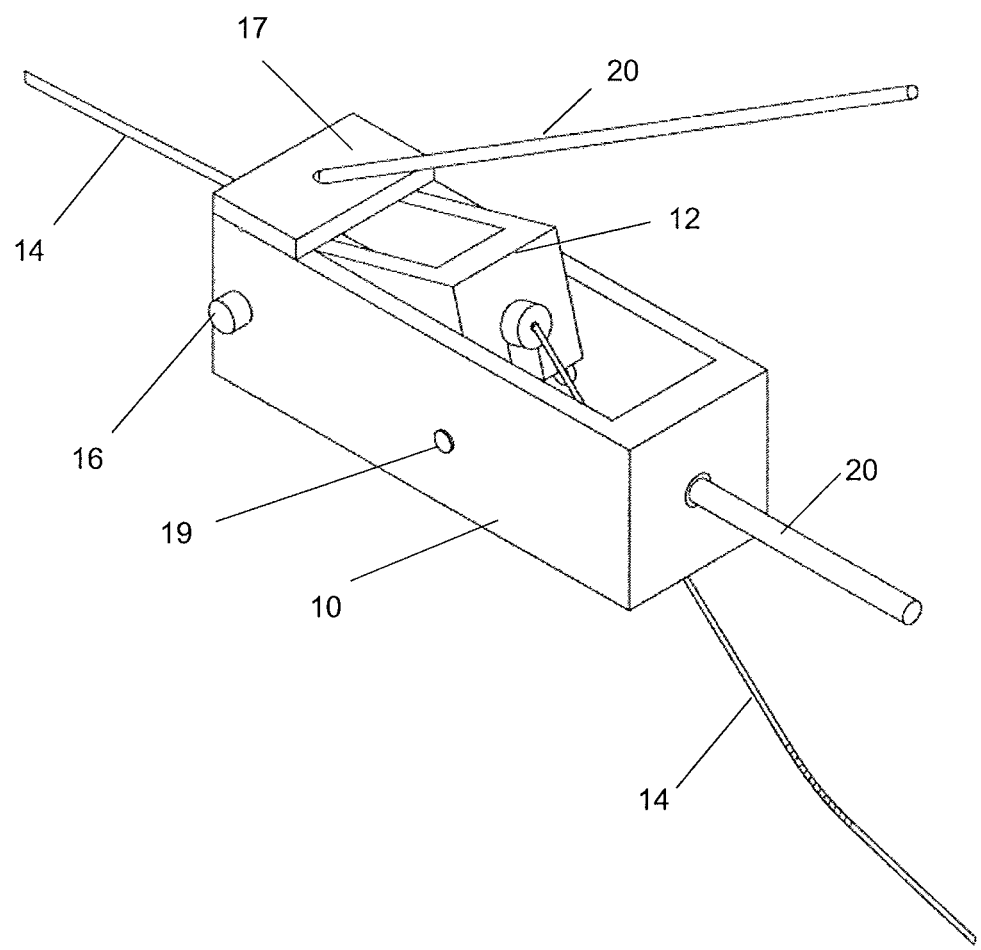
FIGS. 1 and 2 show a first embodiment of the present invention in assembled and disassembled views, respectively.
Figure 2:
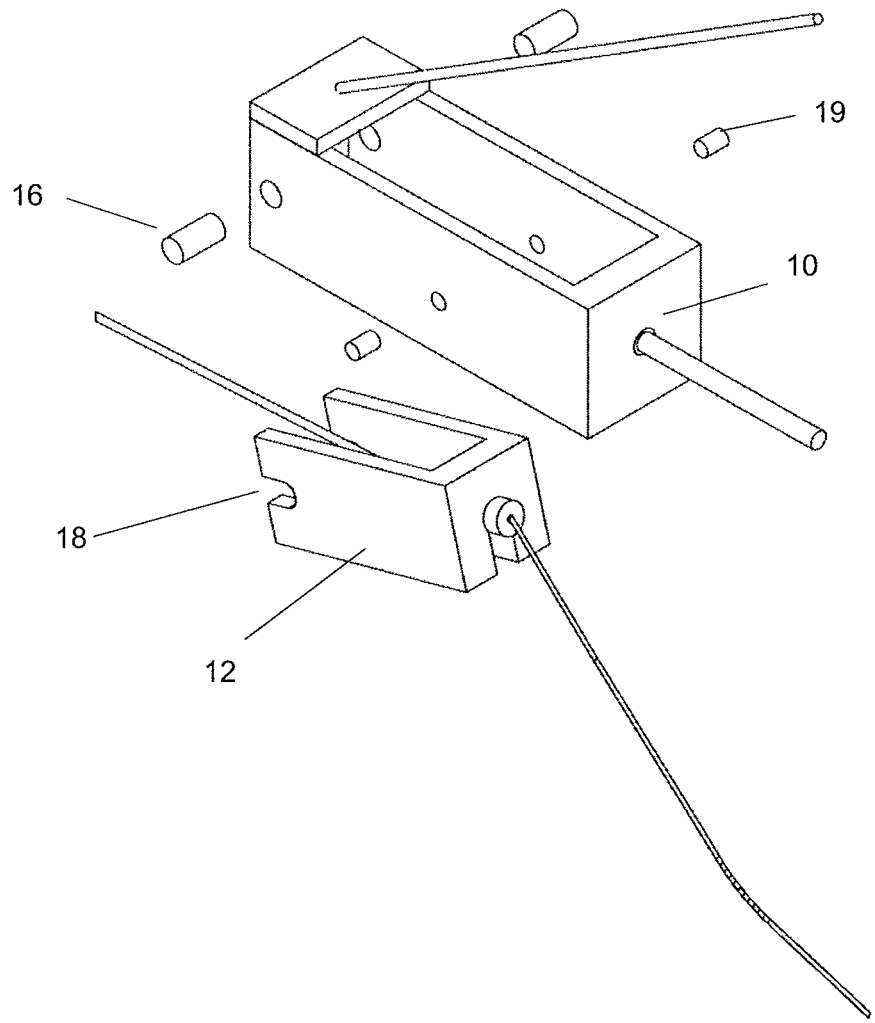

FIGS. 1 and 2 show a first embodiment in assembled and disassembled views, respectively. In FIG. 1, a slotted ground block 10 can be formed from two side plates fastened or welded to a solid end plate leaving its opposite end open. Located inside the slotted area of the ground block 10 is a disconnect block 12 which is also slotted or has an open end. This disconnect block 12 is nestled inside of the open slot of the ground block 10. The suspended line or cable 14 (for example, an electric line) is attached to the closed end of the disconnect block 12. The open end of the disconnect block is pinned near the open end of the ground block 10 by pivot pins 16. This allows the disconnect block 12 to rotate downwardly with respect to the ground block 10. The disconnect block is pinned to the ground block 10 via slotted holes 18 that engage with the pivot pins 16. The slotted holes 18 on the disconnect block allow the disconnect block 12 to disengage from the ground block 10 if and when it is rotates downward (CW) to disengage the slotted holes 18 from the pivot pins 16. The disconnect block 12 is stopped from rotating in the counter-clockwise (upward) direction by hardstop 17, but is free to rotate in the clockwise (downward) direction. The disconnect block 12 is initially retained from rotating downward by shear pins 19 which engage its lower edges. Applying a downward force on the end of the disconnect block 12 allows it to push through or sever the shear pins 19 and rotate downward to disengagement.

The suspended line or cable can be attached to the disconnect block 12, as depicted in FIGS. 1 and 2, by attaching the suspended line 14 in a non-separable manner to the disconnect block 12 by using any standard attachment technique such as clamping. The ground block 10 is supported by cable(s) or bar(s) 20 attached to the pole (not shown).

Figure 3:
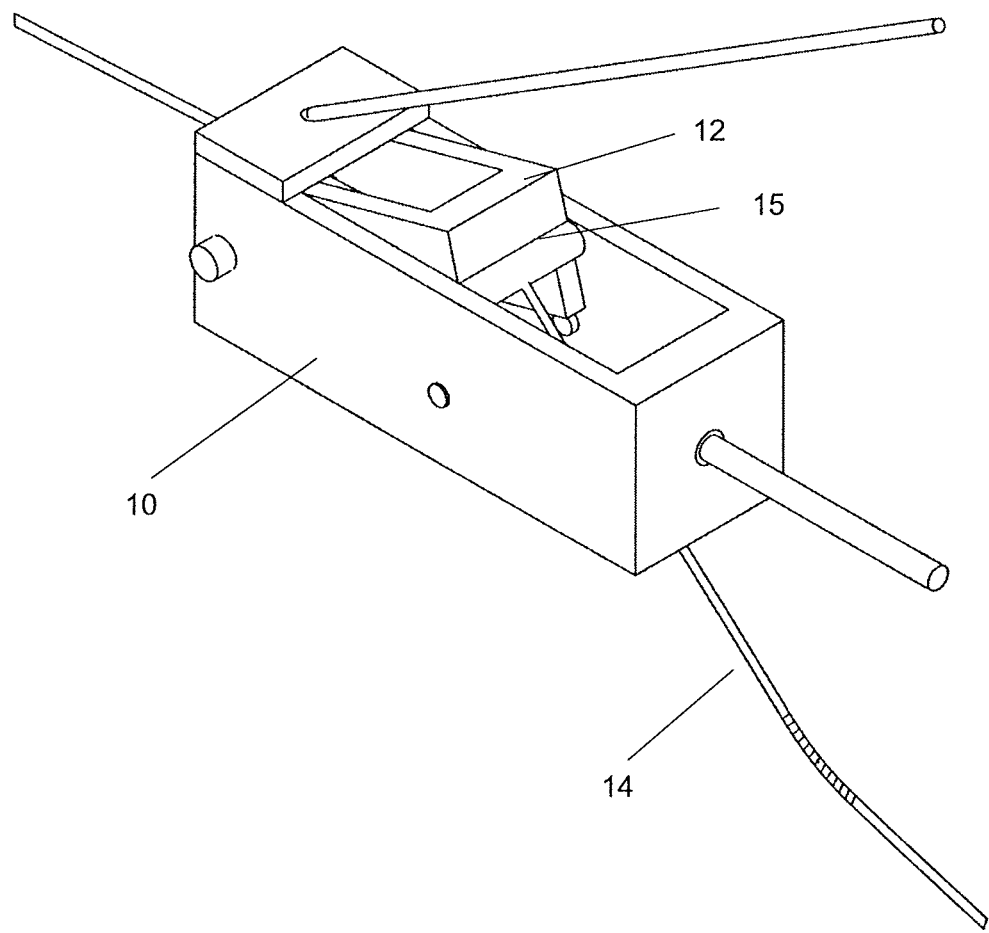
FIGS. 3 and 4 show a second embodiment in assembled and disassembled views, respectively.
Figure 4:
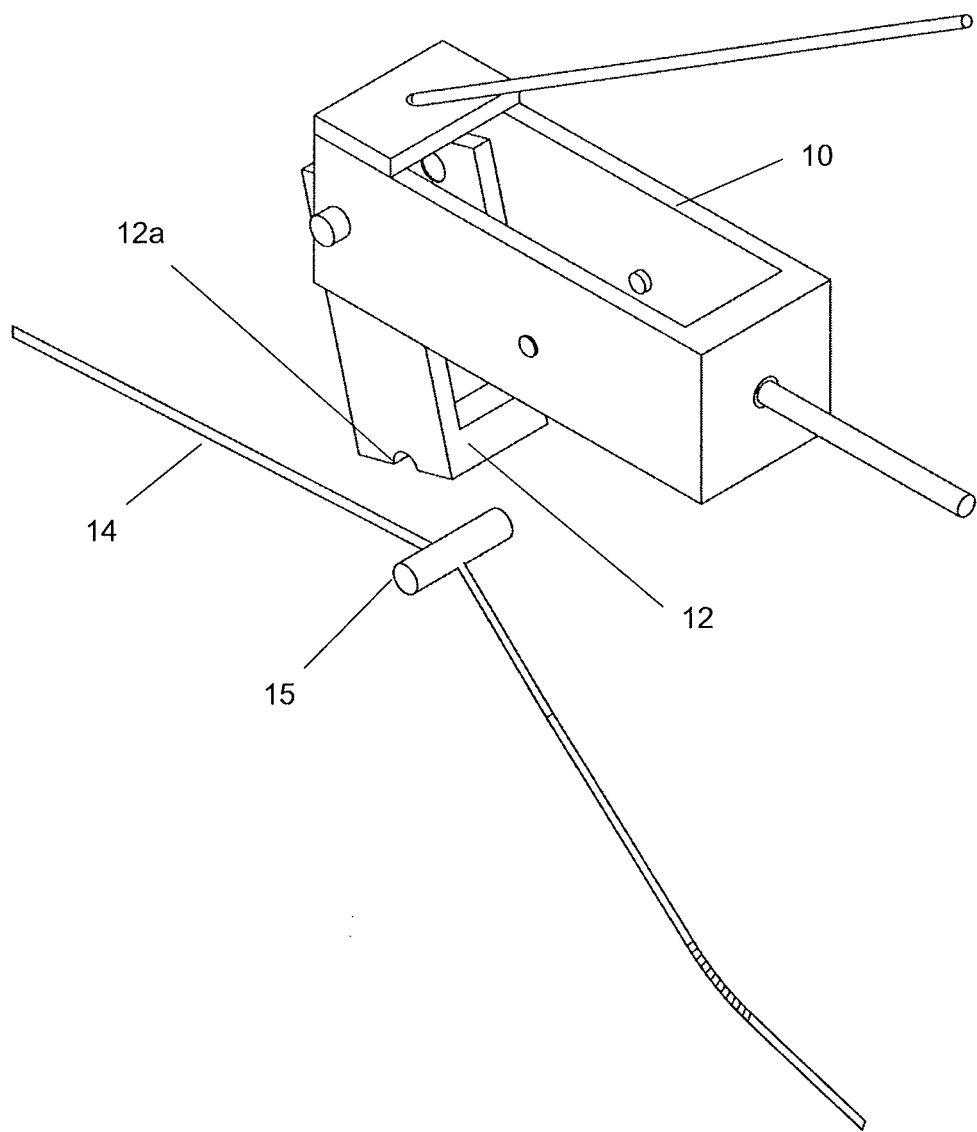

FIGS. 3 and 4 show a second embodiment in assembled and disassembled views, respectively. The parts of the disconnect device are the same as described with respect to FIGS. 1 and 2 above, except that a second way of holding the suspended line 14 to the disconnect block 12 employs a cable holder 15 (for example, a pin) that is clamped to the line 14. The cable holder 15 is seated in a groove 12a formed at the closed end of the disconnect block 12. Again, clockwise rotation of the disconnect block 12 past the shear pins 19 will permit the cable holder 15 (and attached line or cable) to separate from the ground block 10 and thereby the pole. In this case, the disconnect block 12 is pinned with holes (not slots) to the ground block 10 so that the two parts will remain together after the suspended line or cable has been disconnected.

The support structure 20 provides a means of tying or connecting the entire device to the supporting pole. There are different ways in which this can be accomplished; specifically, by using rigid elements (solid bars), by using flexible elements (cables or wire rope) or a combination of both flexible and rigid elements. Whatever they are, the function of the connections to the ground block is to essentially keep it in a relatively fixed position in order to allow the cable disconnect to occur. Furthermore, the connections used to tie the device to the supporting pole may include at least one electrically conductive element so as to provide a continuous electrical path thereby eliminating the need for additional components. In this case, the device may be assembled such that the installation on a supporting pole is of a single device, for example, a single conductive bar (that is attached to but electrically isolated from the pole) with the disconnect devices attached on both ends of the bar.

Figure 5A:
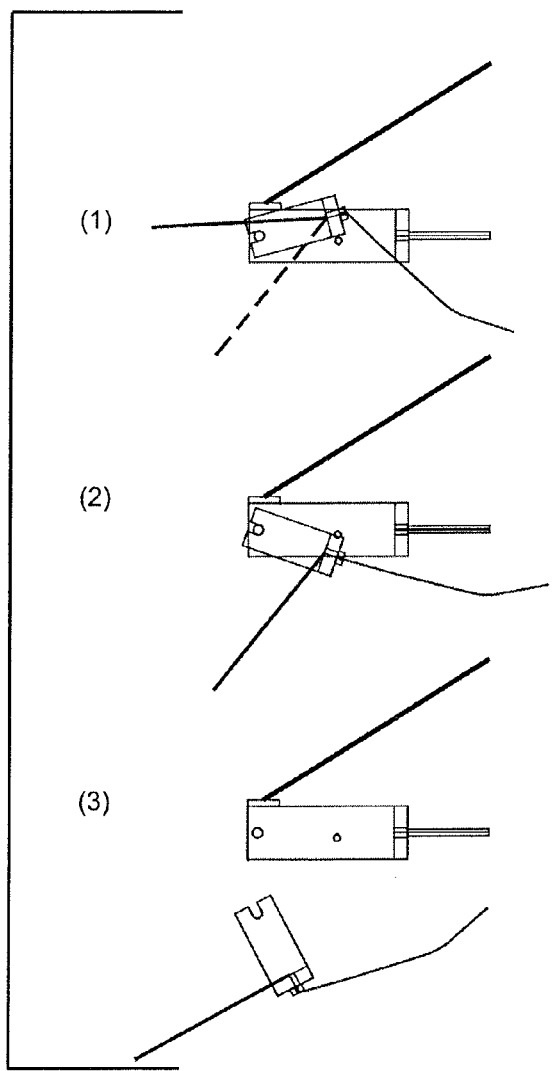
FIGS. 5A and 5B show, side-by-side, how the device operates for the first embodiment of FIGS. 1 and 2 and for the second embodiment of FIGS. 3 and 4, respectively.
Figure 5B:
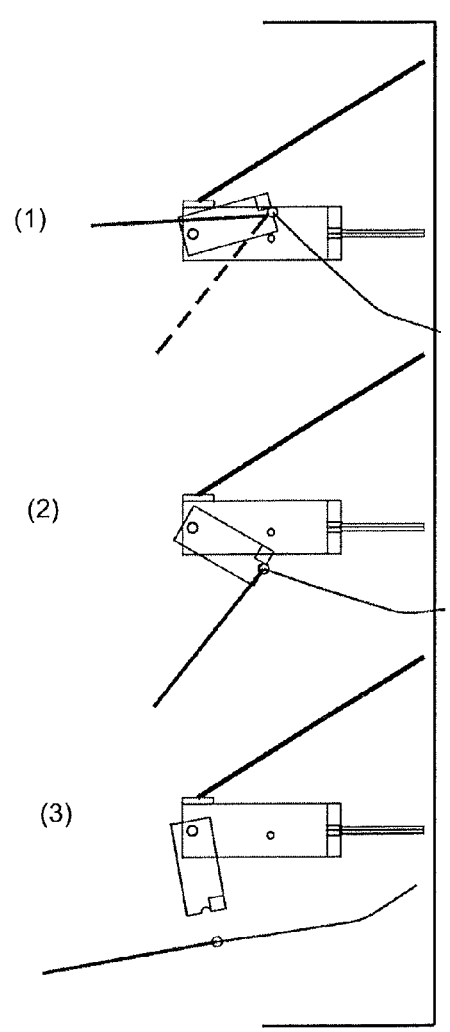

FIGS. 5A and 5B show, side-by-side, how the device operates for the first embodiment of FIGS. 1 and 2 and for the second embodiment of FIGS. 3 and 4, respectively. In normal operation, the tension in the suspended cable acts to pull the pinned disconnect block against the hardstop (as noted before, CCW rotation is not possible because of this hardstop). This will remain the case until two things happen; as shown in the numbered sequence of stages in the drawings, these are: (1) the tension in the cable increases and (2) the line of action (or angle) of the tension shifts enough to cause CW motion of the disconnect block causing (3) the disconnect block to release. Both of these conditions must be met in order for the device to disconnect from the supporting pole. A falling tree, for instance, is an event that will precipitate both conditions. The disconnect block will rotate until, depending on how the cable (or rope) is attached to it, separation of the block or the cable itself occurs.

Figure 6:
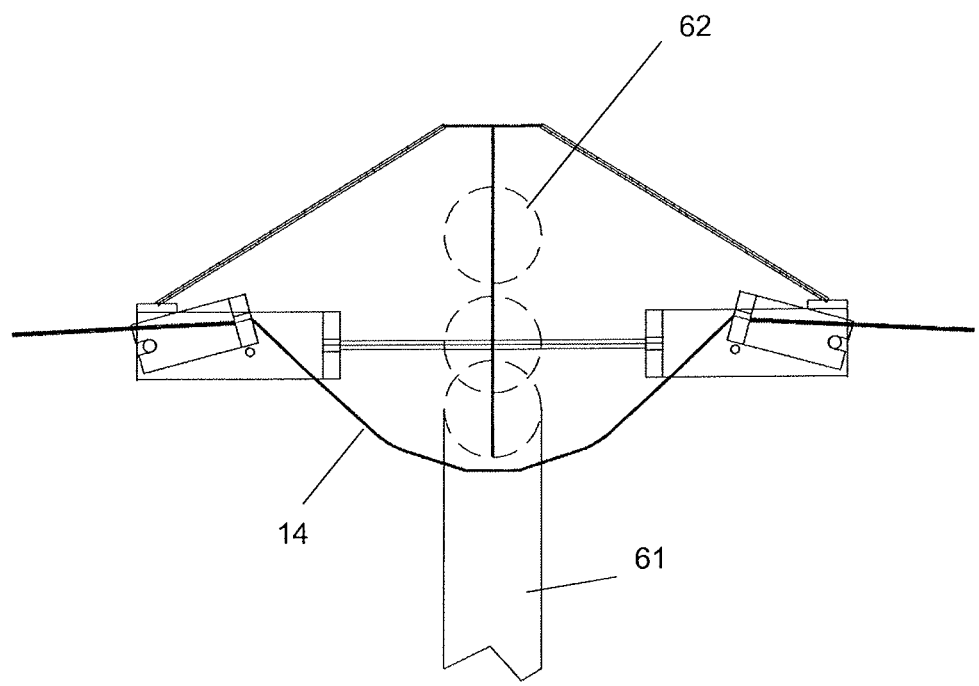
FIG. 6 illustrates how tension on the suspended line can be transmitted to a second disconnect device located on the opposite side of the same supporting pole.

Depending on the distance between supporting poles, a single point separation from the pole may not be enough to sufficiently relieve the tension or force on the cable (since the tree, for example, may still be supported by the cable). As shown in FIG. 6, the tension can be transmitted to a second disconnect device (mirrored or located on the opposite side of the same supporting pole) and cause it to rotate CCW thereby permitting a second disconnect to occur. In most cases, because of the length of suspended cable between supporting poles, the second disconnect should produce enough slack in the cable to permit the tree or other object to fall to the ground and relieve all forces on the supporting pole. FIG. 6 also shows various positions 62 for a cross beam to which the disconnect devices may be attached on the supporting pole 61. Any of these attachment schemes is possible as long as, depending on the application, the suspended cable 14 loops under the cross beam for continuity and to allow successive cable releases. In some instances, this loop may be eliminated with the supporting cable terminating on each disconnect block and electrical continuity provided by a structural element of the supporting structure (that is, an element that connects the device to the supporting pole). As noted before, the actual attachment to the cross beam may occur by using flexible or rigid elements or a combination of both; the method used may influence the relative position of the devices with respect to the cross beam.

Figure 7:
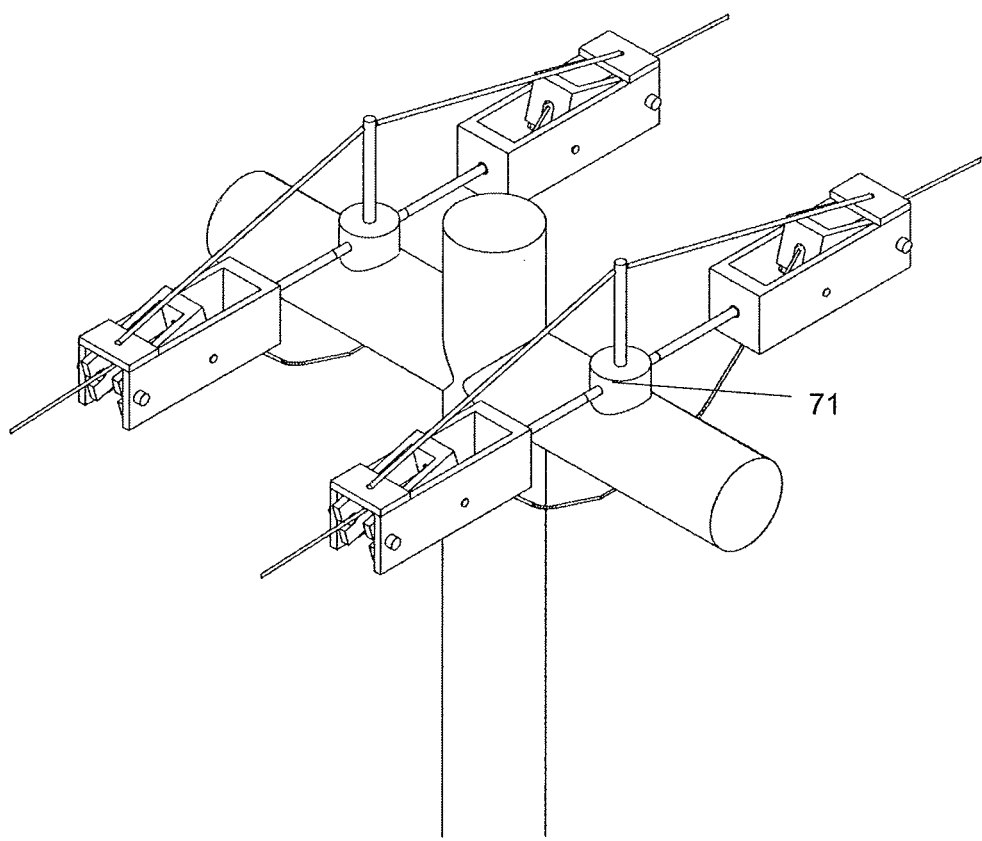
FIG. 7 illustrates multiple disconnect devices installed on a single supporting pole.

FIG. 7 illustrates multiple disconnect devices installed on a single supporting pole. A number of additional features may be incorporated to the basic systems described above. For instance, the disconnect block may contain a stop (shear pins) that must be sheared off (during its motion) in order for the disconnect to occur; this would mean that in addition to meeting the two criteria noted above for disconnection, the shearing action must occur, as well. With this feature, the device can be tailored to only disconnect under a specific force even if both of the other criteria are met.

Another feature that may be added is that of disconnecting service lines that may tap into the supported transmission line. With this feature, the disconnect block may be connected to the live electric cable but in a manner such that the supporting wire rope (or cable) is electrically isolated from it. This can be accomplished in a number of ways, for example, the connection of the supporting cable to the disconnect block can be done via a ceramic (or other high voltage compatible) insulator or a separate plate can be attached to the disconnect block with an insulator to prevent the entire block (and therefore, the supporting cable) from being electrified. There will be corresponding contact surfaces on the ground block in this arrangement. In the embodiment of FIG. 1, a live electric wire could be tapped and electrically connected to one or more plates on the disconnect block; the plate(s) is/are then held in contact with a similar plate(s) on the ground block. From the ground block contacting plate, service wires will lead off the supporting pole. In the embodiment of FIG. 3, the cable holder will be modified to feature a plate that is electrified by tapping into a live electric wire. This plate will be held in contact with a similar plate on either the ground block or the disconnect block. From either of these blocks, service lines will lead off the supporting pole. Alternatively, service line taps can be achieved by using connectors that will be positioned on the disconnect and ground blocks such that rotation of the former will cause the two halves of the connectors to separate and therefore disrupt the electrical path.

Another feature that can be added to the invention is one in which the rotation of the disconnect block can initiate and cause the rotation of other connected elements. The disconnect block may also have a built in ratcheting mechanism that makes it easier to install and adjust and the rotating motion of the disconnect block can be used to initiate other motions or disconnects.

Figure 8:
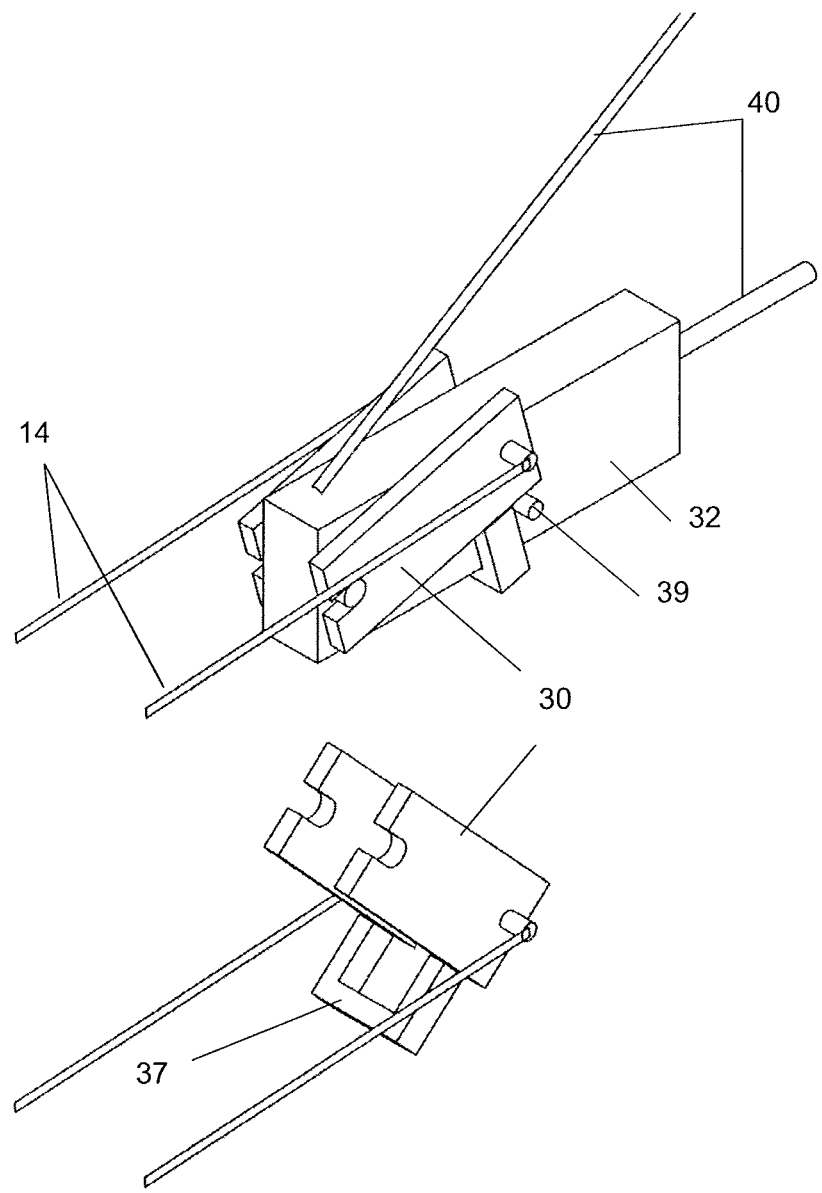
FIG. 8 shows another embodiment in which the disconnect block straddles on the outside of the ground block.

FIG. 8 shows another embodiment for the disconnect and ground blocks, in which the disconnect block 30 straddles on the outside of the ground block 32 and the suspended line or cable 34 has two sections coming from the same direction that are attached to the disconnect block 30. For there to be no moment on the ground block, the supporting cable must be either two separate cables that are each tied to the disconnect block, or the two cables can be joined together to then support a single cable between poles (put another way, the single supporting cable between poles can be split to tie to the disconnect block, as shown). A variation on this configuration is possible, in that only one cable may be tied to the disconnect block but on the condition that at least one of the members supporting the device on the pole must be rigid and cable of reacting to moment loads. This second variation may be preferable for lower tension systems as by its very nature, the loading on the pivot pins will be cantilevered and the loading on the pole will have a moment load. The disconnect block 30 is prevented from upward rotation by hardstop 37 and retained initially from downward rotation by shear pins 39. The device is held on a supporting pole by attachment elements 40.

In each configuration described above, the disconnect device may employ the use of a commercially available tension fitting. It is assumed that the primary objective of the device is to support or suspend electrical cables. The tension fitting allows a cable to be inserted in one direction and internal springs clamp the cable to prevent its removal in the opposite direction. Thus, the fitting is able to carry electricity while being in tension loading. This fitting, in the various configurations, may be replaced with a compression or crimp fitting with an appropriate support bracket. The use of off-the-shelf parts is likely to reduce the cost of the device while enabling technicians to work with a familiar part especially during initial installation of the device.

Figure 9:
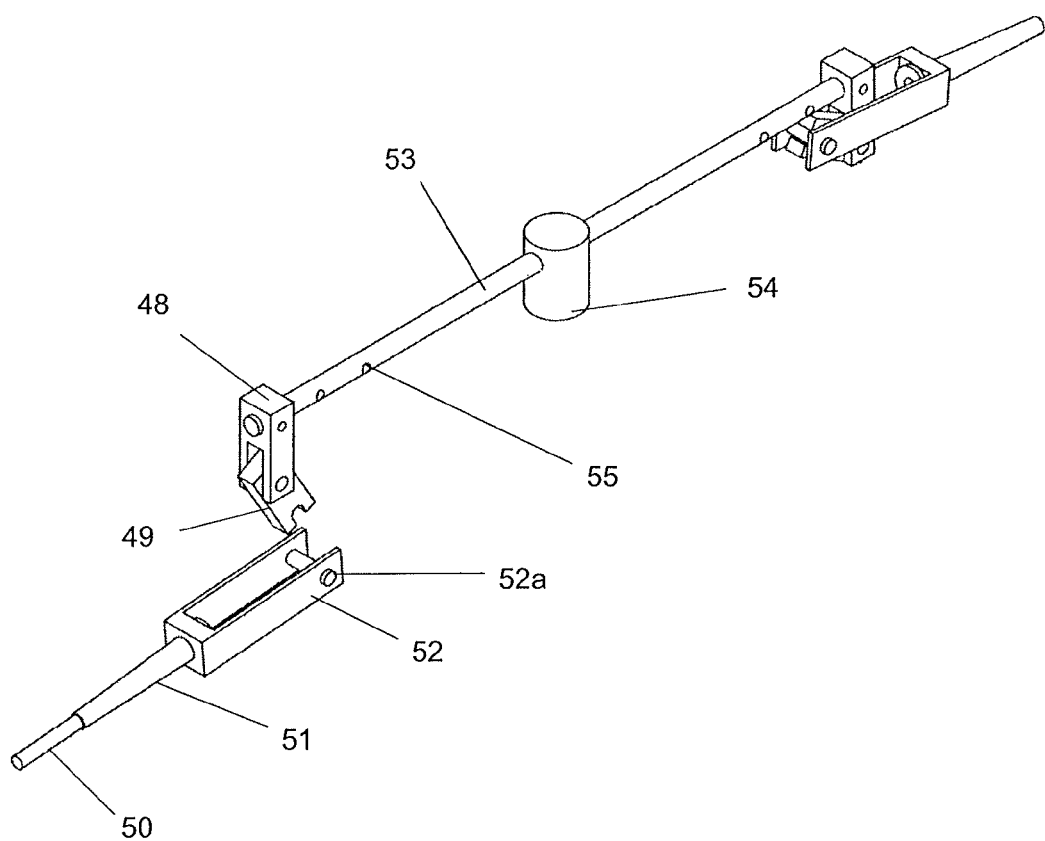
FIG. 9 shows another embodiment in which the ground block and supporting structure are used as an electrically conductive path.

FIG. 9 shows another embodiment in which the ground block and supporting structure are used as an electrically conductive path. The figure shows two devices each having a ground block 48 detachable from a disconnect block 49 (the device on the right side shown attached, and on the left side shown detached) which are respectively attached to a cable section 50 via tension fitting 51 and fitting support bracket 52 with pin 52a on opposite sides of a supporting bar 53 supported on an electrical isolator 54 on a supporting pole cross beam (not shown). An adjustment feature 55 enables adjustment of the device position on the supporting bar 53. The electricity will flow from each suspended cable into the fitting support bracket via the tension fitting and into the ground block. From the first ground block, the path continues to the opposite end of the support bar and into the second ground block, then to the fitting support bracket and back into the second suspended cable via the tension fitting. Since the fitting support bracket is electrified, it is possible to electrically "tap" it in order to provide electrical service localized to the supporting pole or its immediate environs. In this configuration, it is necessary to maintain electrical isolation between the supporting bar and the supporting pole. As shown in the figure, the system may include a means for pinning, fastening or attaching the ground block to the supporting bar in an adjustable manner so as the take up slack in the supported cables and ease installation.

Figure 10:
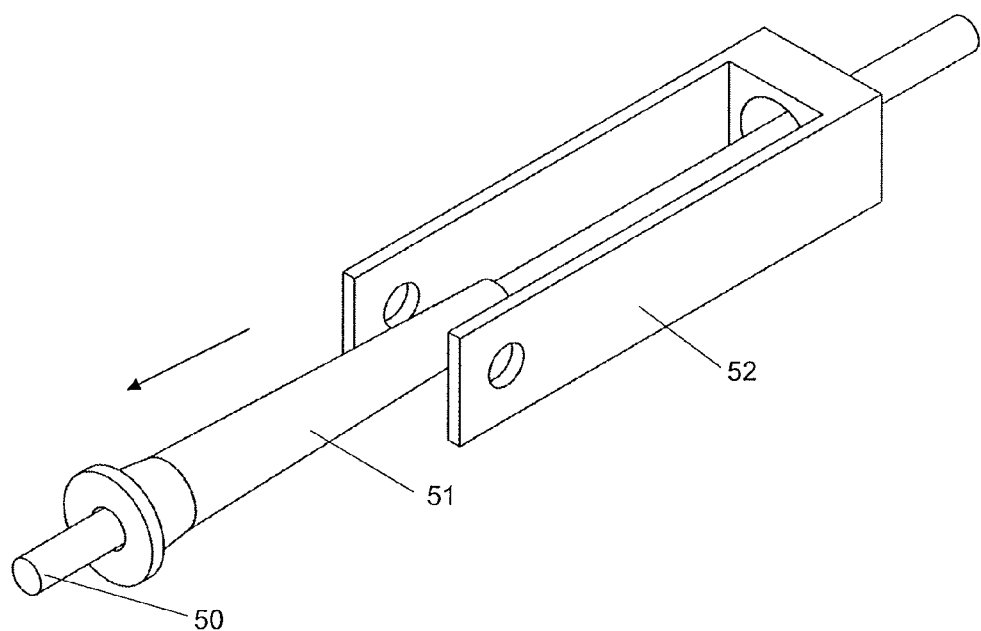
FIG. 10 shows a detailed view of the tension fitting and supporting bracket.

FIG. 10 shows a detailed view of the tension fitting 51 and supporting bracket 52. As shown, the suspended cable 50 is easily inserted in one direction (of the arrow shown) but is locked from moving in the opposite direction.

Figure 11:
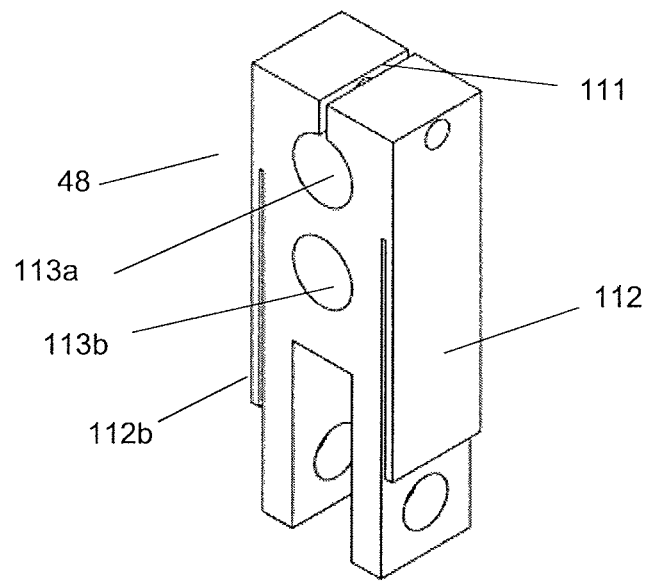
FIG. 11 shows a version of the ground block that includes integral cantilever or flexure springs.

FIG. 11 shows a version of the ground block 48 that includes integral cantilever or flexure springs 112, 112b for improved contact with the fitting support bracket. The figure also shows a design of the ground block that permits it to be mounted through holes 113a, 113b for assembly on two supporting bars. Also shown is clamping mechanism 111 in the form of a slot to enable clamping onto a supporting bar or bars that provides a means for adjusting position of the ground block with respect to the supporting bar(s).

Figure 12:
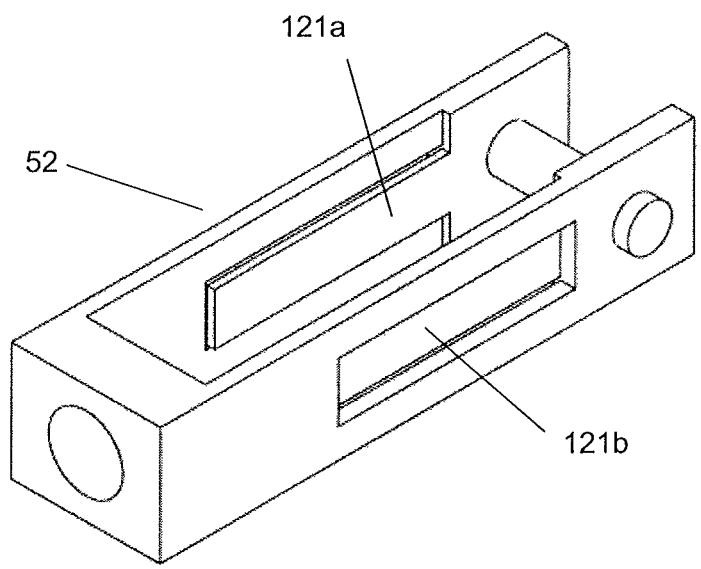
FIG. 12 shows the fitting support bracket with integral flexure springs.

FIG. 12 shows the fitting support bracket 52 with integral flexure springs 121a, 121b for improved electrical contact with the ground block.

Figure 13:
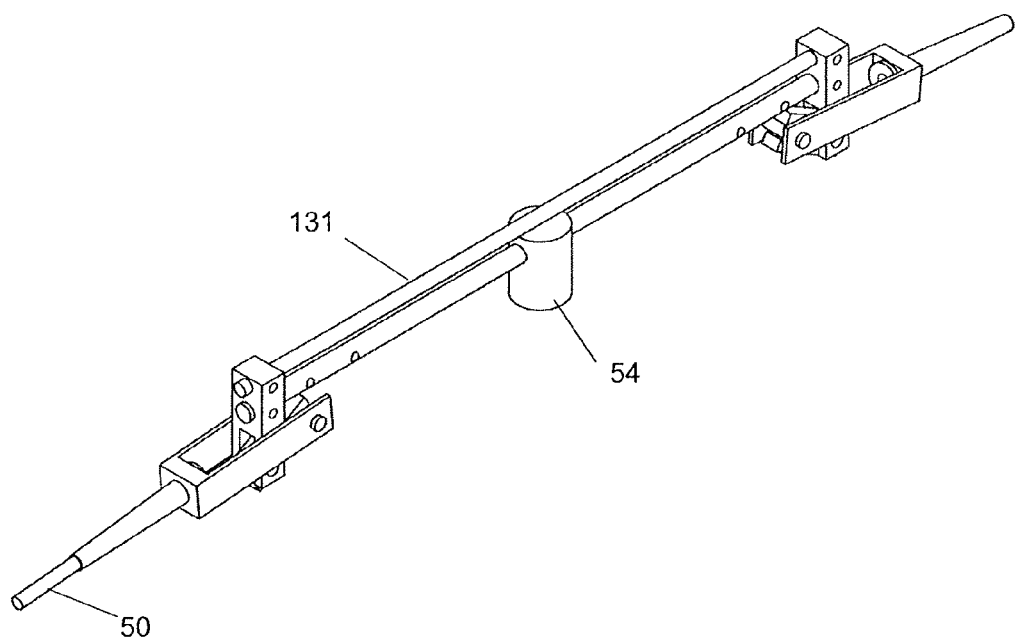
FIG. 13 shows another design in which the supporting bar is made entirely or partially non-conductive.

FIG. 13 shows another design in which the supporting bar is made entirely or partially non-conductive at the points at which the ground blocks for the cable 50 are attached. Alternatively, isolation spacers may be used between the ground block and the supporting bar—in which case, the supporting bar may be conductive. In this approach, the electrical path is the same as described for the main embodiment with the exception that a "jumper" cable 131 is used to provide continuity between the two ground blocks (as opposed to the supporting bar). An advantage of using this design approach is that the entire mechanism can be attached to the supporting pole using a bracket 54 and without the use of an electrical isolator.

Figure 14:
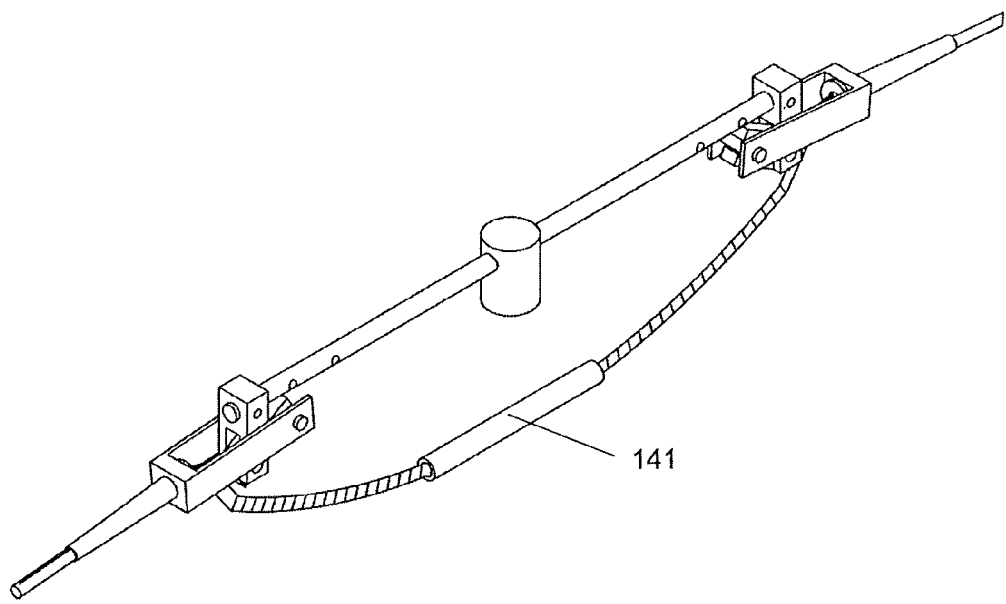
FIG. 14 shows another design in which electrical continuity is obtained by using an off-the-shelf splice.

FIG. 14 shows another design in which electrical continuity is obtained by using an off-the-shelf splice 141 to connect the two ends of the supported cables under the cross beam. This electrical path is more direct and thus will reduce cost of implementation. In this case, by using non-conductive materials for one or more of: (1) the supporting bar (2) ground blocks or (3) fitting support bracket, the need to use an isolator where the device attaches to the cross beam of the supporting pole may be eliminated.

Figure 15:
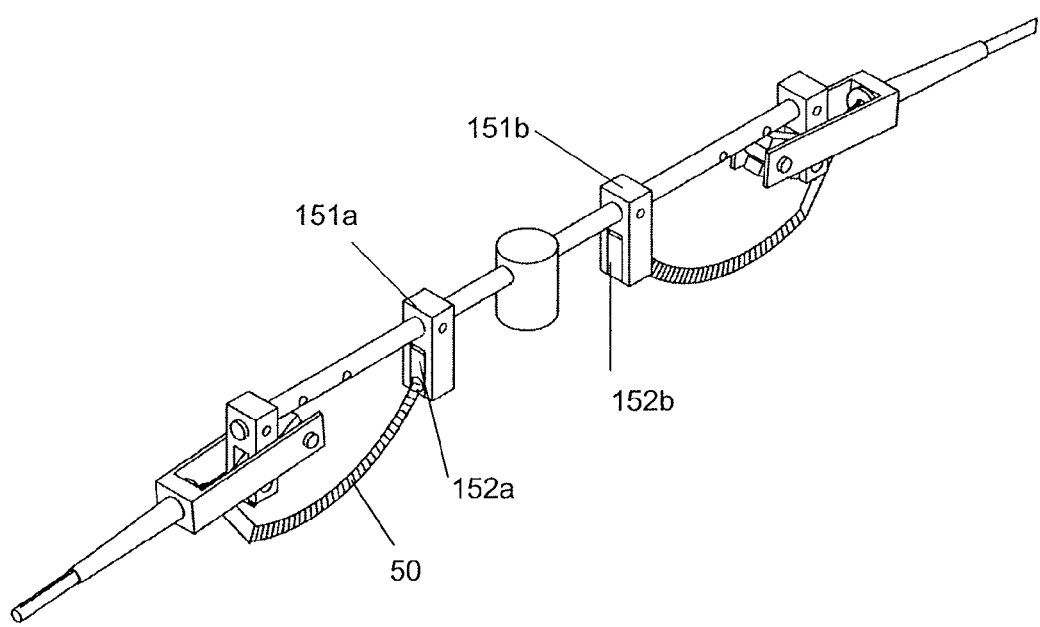
FIG. 15 shows another design in which electrical continuity is obtained by installing contacts at the ends of the supported cables.

FIG. 15 shows another design in which electrical continuity is obtained by installing contacts 152a, 152b at the ends of the supported cables 50. These contacts then engage with contact clamps 151a, 151b which are mounted onto the supporting bars which are also used in the electrical path. Flexure springs may be used to maintain preload between the contacting elements. An advantage of this implementation is that by maintaining an electrical path only through the contacts, power transmission may be switched off by simply and easily disengaging the contacts.

Figure 16:
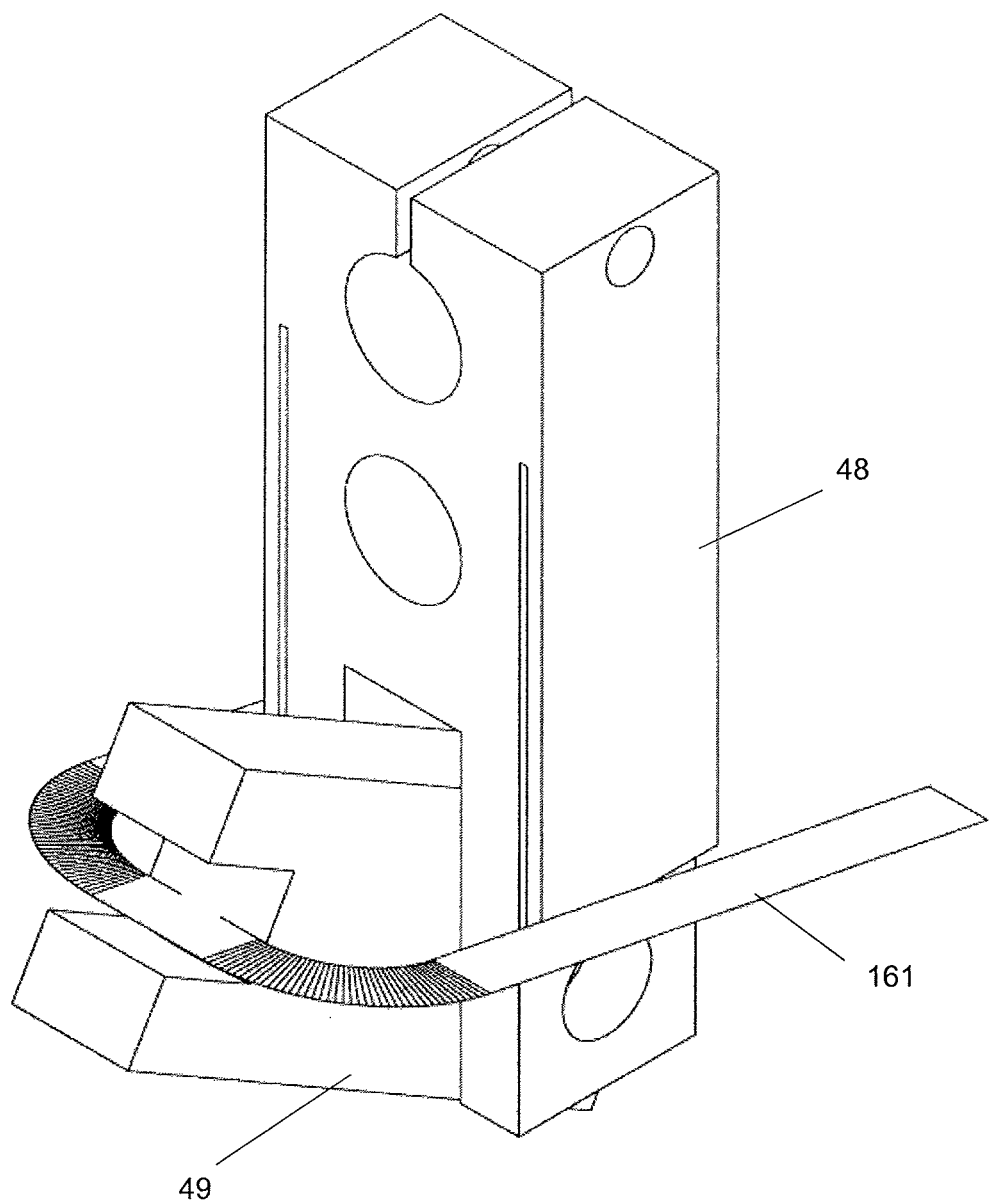
FIG. 16 shows another design in which the disconnect block (not separable from the ground block) is slotted to hold a steel wire cable.

FIG. 16 shows another design in which the disconnect block 49 (not separable from the ground block 48) is slotted to hold a steel wire cable 161. The ends of this cable are connected to the tension fitting support bracket. Clearly, in keeping with the invention, rotation of the disconnect block with respect to the ground block will cause the steel wire cable to separate from the disconnect block and thus, the suspended cable from the supporting pole.

The various implementation of the invention described above are only examples and other arrangements are possible. Furthermore, features of each described implementation may be mixed with features of any of the others in order to produce a design that is in keeping with the invention.

The invention claimed is:
1. A disconnect device for suspended lines comprising:
 (a) a ground member that provides a supporting structure for mechanically grounding or tying the device to a supporting pole; and
 (b) a disconnect member to which a suspended line or cable is attached, which is movable or rotatable for detachment from the ground member,
 wherein the disconnect member comprises a first part mechanically fixed to the supporting pole and a second part holding the suspended line or cable that can rotate with respect to the first part, and
 wherein the disconnect device is mounted onto a supporting bar with an electrical insulator placed between contacting surfaces.
2. The disconnect device in claim 1, in which the suspended line or cable is an electrical cable.

3. The disconnect device in claim 1, in which the two parts are separable following rotation of the second part with respect to the first part.

4. The disconnect device in claim 1, in which the two parts do not separate after rotation of the second part with respect to the first part.

5. The disconnect device in claim 3, in which a suspended cable or wire is mechanically fastened to the second part.

6. The disconnect device in claim 4, in which a suspended cable or wire is mechanically fastened to the second part.

7. The disconnect device in claim 1, in which the first part forms a continuous electrical path from the suspended line or cable from contact with a holder or fitting through a bracket through supporting bar and to a second suspended line or cable.

8. The disconnect device in claim 1, in which the first part is adjustable or is free to translate and be fixed to a supporting bar at various positions by means of a ratchet, fastener or clamp.

9. The disconnect device in claim 1, in which the parts are attached to a supporting pole with one or more rigid or flexible components or a combination of each.

10. The disconnect device in claim 7, in which an electrical path is formed with springs providing preload between contacting parts.

11. The disconnect device in claim 6, in which the suspended line or cable is held in a slot in the non-separable part in order to allow its separation from the non-separable part after its rotation under load.

12. The disconnect device in claim 1, in which a jumper cable is attached to a pair of disconnect devices on both ends of the supporting bar thereby providing a continuous electrical path to the suspended line or cable.

13. The disconnect device in claim 1, in which rotation of the disconnect member is prevented by a shear pin.

14. The disconnect device in claim 1, in which ends of the suspended line or cable arranged on opposite sides of a supporting pole are spliced together for electrical continuity.

15. The disconnect device in claim 1, in which ends of the suspended line or cable arranged on opposite sides of a supporting pole are fitted with a contact to form a continuous electrical path to and from the suspended line or cable.

16. The disconnect device in claim 15, in which the contact is held in spring 5 loaded contact with a mating bracket.

17. The disconnect device in claim 7, in which the bracket is electrically tapped to provide secondary electrical paths.

18. The disconnect device in claim 1, in which rotational motion of the disconnect member produces a disconnection of secondary contacts or electrical paths.

\* \* \* \* \*